March 22, 1960 P. E. MADELEY ET AL 2,929,669
TIMING LINE NUMBERING APPARATUS
Filed July 9, 1956 3 Sheets-Sheet 1
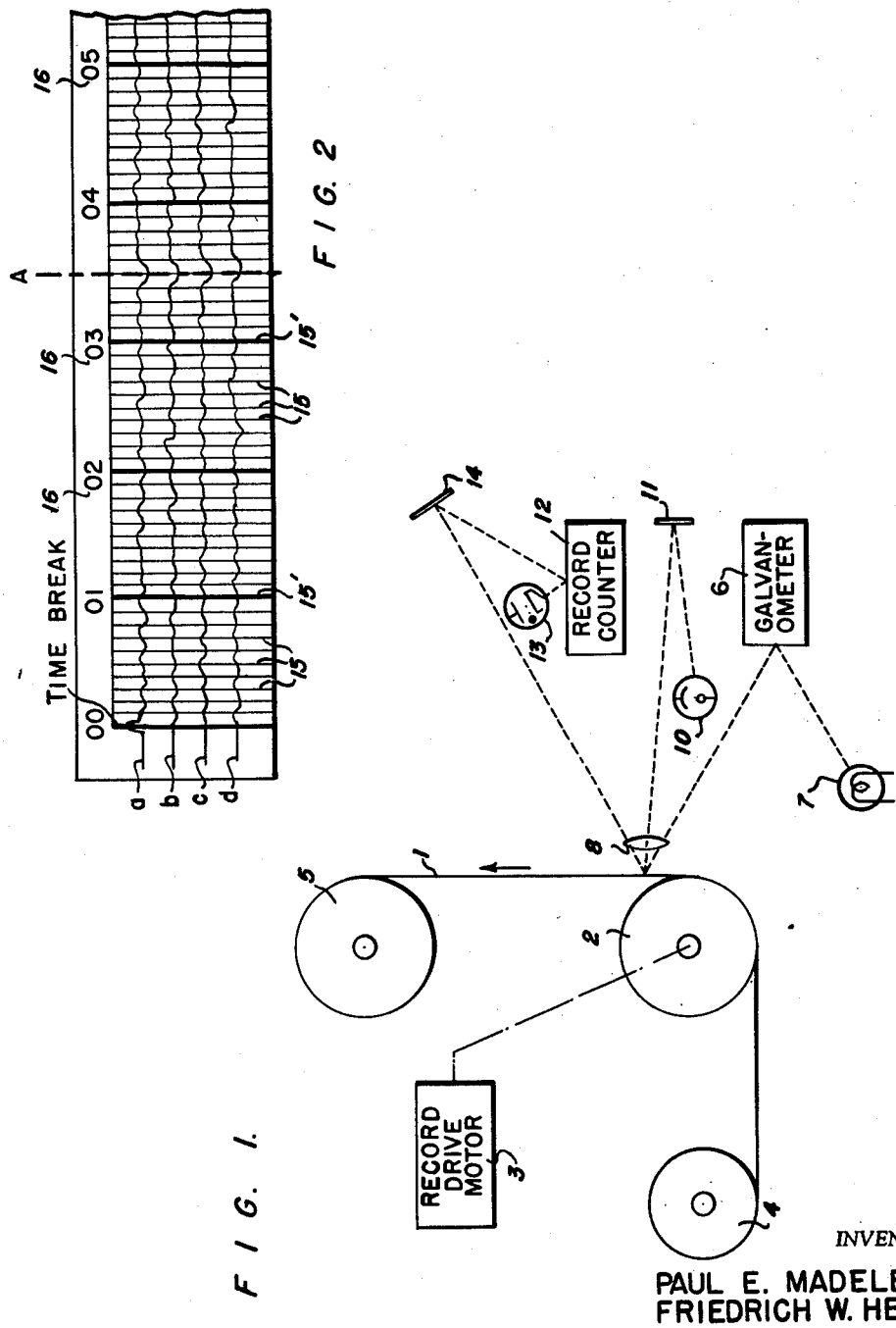
INVENTORS
PAUL E. MADELEY
FRIEDRICH W. HEFER
BY Thomas O. Arnold
ATTORNEY

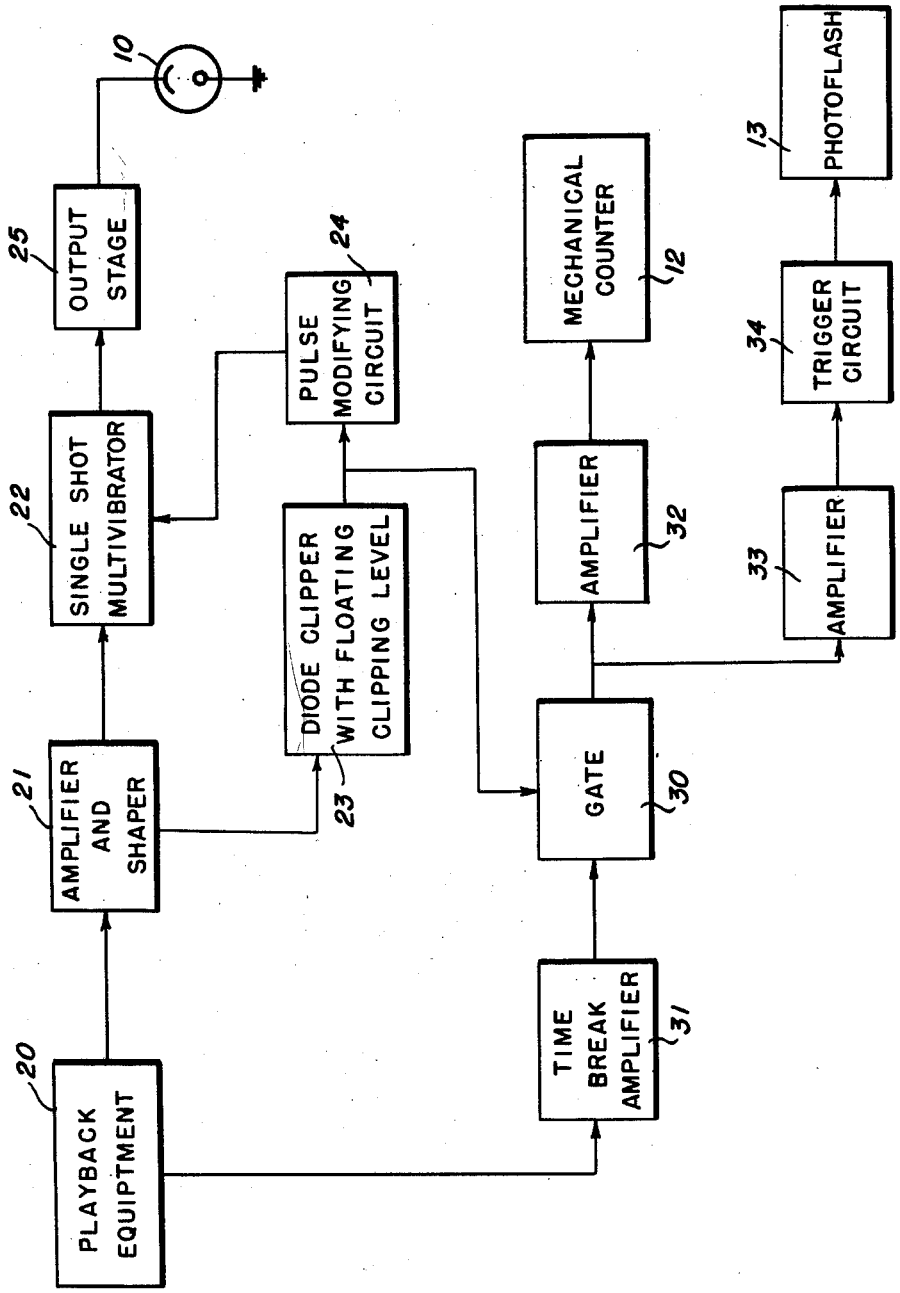

March 22, 1960 P. E. MADELEY ET AL 2,929,669
TIMING LINE NUMBERING APPARATUS
Filed July 9, 1956 3 Sheets-Sheet 3

INVENTORS
PAUL E. MADELEY
FRIEDRICH W. HEFER
BY Thomas O. Arnold
ATTORNEY

United States Patent Office 2,929,669
Patented Mar. 22, 1960

2,929,669

TIMING LINE NUMBERING APPARATUS

Paul E. Madeley and Friedrich W. Hefer, Harris County, Tex., assignors, by mesne assignments, to Dresser Industries, Inc., Dallas, Tex., a corporation of Delaware Application July 9, 1956, Serial No. 596,555

4 Claims. (Cl. 346—23)

This invention relates to recording timing indicia, and, more particularly, to apparatus for automatically numbering timing lines on photographic records.

In the geophysical prospecting field it has become conventional to record geophone outputs on a photographic record by galvanometers supplied with the geophone voltage signals and controlling the relative positions of light energy reflected from the galvanometers onto the record. After the photographic record is developed and fixed it is available for examination and analysis. However, if such records are to be susceptible of analysis they must have some time scale thereon, so that it has likewise become conventional to record timing information along with the geophone signals on the photographic record. Such timing information has been derived and recorded in several different manners in the past, but a particularly advantageous method is that disclosed in an application of Erath, Madeley and Hefer, titlted "Method and Apparatus for Generating and Employing Timing Pulses," Serial No. 576,652, filed April 6, 1956.

In the method of the above application, a wave of equally time-spaced pulses of voltage with every $n$th pulse of greater amplitude than the others is recorded along with the geophone signals on a magnetic record tape when the shot is fired. When the magnetic tape is played back to record the geophone signals on a photographic record, the time-spaced pulses are detected and the wave converted into a series of pulses with every $n$th pulse of greater width than the others, the series of pulses then being used to energize a light source which forms lines on the record of width corresponding to the width of the corresponding pulses. These timing lines form a very good time scale for the geophone information, but it has been necessary to count the lines and number them manually after the record is developed. Since the $n$th pulses conventionally represent tenths of a second and the other pulses one hundredths of a second, it will be appreciated that the counting and numbering operations for a five second record are tedious and time-consuming.

The apparatus of the present invention is designed to provide numerals on a photographic record automatically, along with the other information recorded thereon, to represent increasing time. It is particularly designed for use in recording geophone output signals and with the method of recording timing lines of the above application, but it could as well be used in conjunction with recording any signals which vary with respect to time and with any other method of recording timing information on the record.

The apparatus of the present invention, generally speaking, includes means for generating a train of equally time-spaced pulses of voltage, a mechanical counter advanced automatically by said pulses, and a light source cooperating with said counter to direct light energy modulated by the numeral positioned by the counter onto the photographic record, the light source being energized by the pulses of voltage. This apparatus may also be associated with apparatus for forming lines on the record by using said train of pulses to control a second light source which illuminates a narrow strip of the record as it passes the source.

The invention will now be more particularly described in conjunction with a preferred embodiment thereof, as shown in the accompanying drawings. In the drawings:

Fig. 1 is a diagrammatic showing of a photographic recorder and major elements of the apparatus of the invention associated therewith;

Fig. 2 is a representation of a photographic record of the type that might be obtained with the apparatus of Fig. 1;

Fig. 3 is a block diagram of the electrical apparatus used to control the light sources and the counter of Fig. 1.

Figure 4:
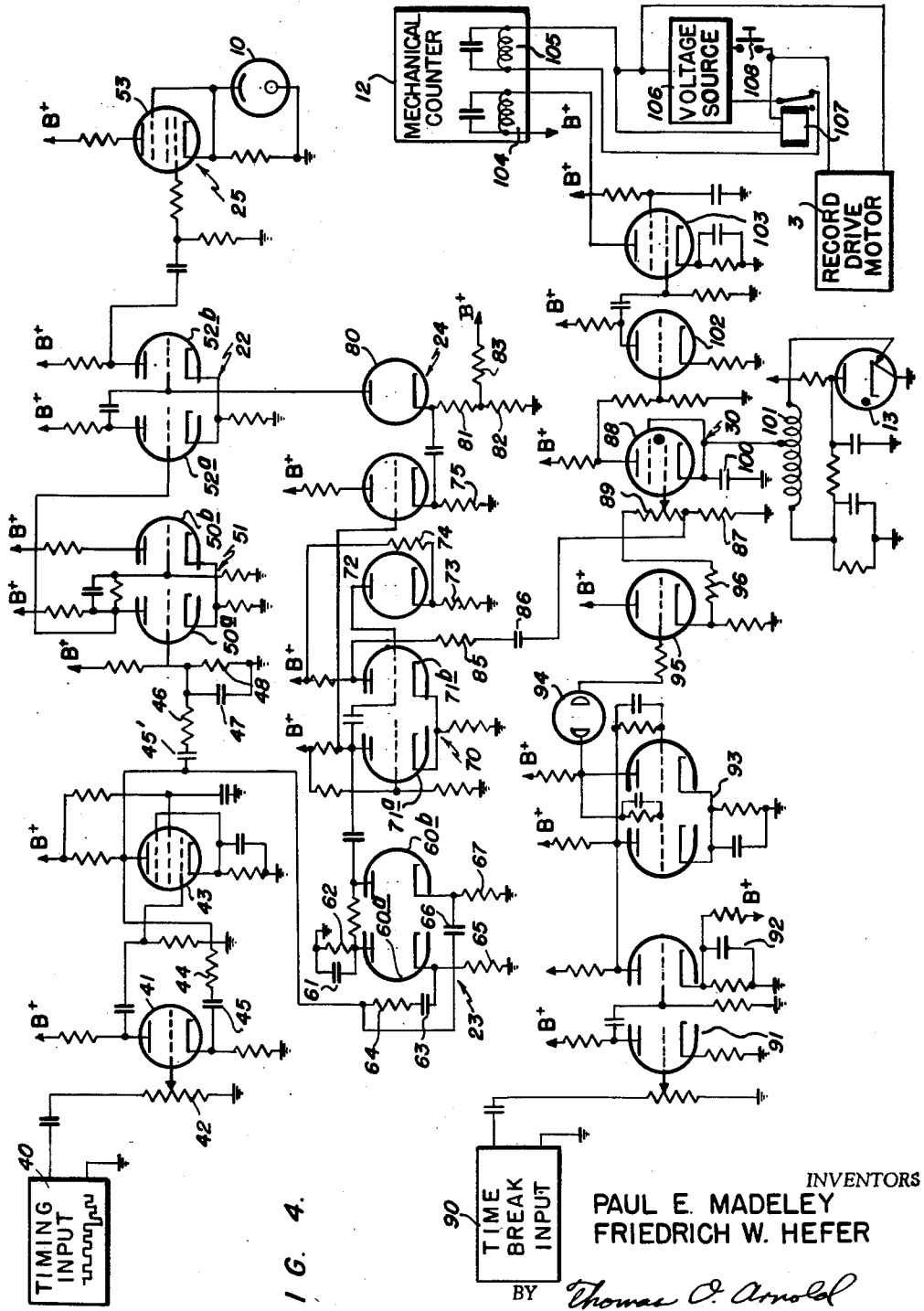
Fig. 4 is a schematic diagram of the apparatus of Fig. 3.

Referring first to Fig. 1, the main elements of the usual oscillograph used for recording geophone output voltages are there shown. The geophone voltages are recorded on a photographic film or record 1 which is driven in the direction of the arrow by a driver drum 2 driven by the usual drive motor 3. The film is taken from a spool or drum source 4 and, after being exposed to form the desired record, it is taken up by spool or drum 5.

The geophone output voltages are applied to the usual galvanometers, such as indicated at 6, to control the positions of mirrors which direct light energy from one or more light sources 7 through a lens 8 onto the record. The magnitudes of the geophone voltages determine the ordinates of the light energy reaching the record, while the abscissa represents time, as determined by the speed of passage of the film past lens 8.

The apparatus so far described is only the conventional oscillograph designed for geophone recording. In order to place timing identification on the record to permit analysis thereof, the apparatus of the invention includes light source 10 capable of energization by pulses of voltage to direct pulses of light energy onto a mirror 11 and from there through lens 8 onto record 1. The apparatus for energizing light source 10 will be described hereinafter, but suffice it to say at this time that the light source is energized in such fashion that it forms lines perpendicular to the width of the record every predetermined interval of time, with every $n$th line wider than the others.

The apparatus shown in Fig. 1 also includes the standard type of mechanical counter 12 which carries a series of consecutive numerals, such as 00 to 99, and appropriate means for moving the numerals to position them in a predetermined location, such as a viewing slot in the case of the counter. As will be shown hereinafter, the counter 12 is stepped up automatically by equally time-spaced pulses of voltage applied to an energizing coil to position the numerals sequentially in said predetermined location. Light energy from a light source 13, such as a photo-flash lamp, is directed onto the counter to illuminate the numerals in said predetermined location, and the light energy, modulated by the numeral, is directed by a mirror 14 through lens 8 onto the photographic record 1. As will be explained subsequently, light source 13 is also energized by pulses of voltage in regularly time-spaced fashion to record the numerals from the counter in sequential fashion, along with the timing lines, on the record.

Fig. 2 shows the type of record that might be obtained with the apparatus of the invention with the usual geophone signals. Four traces $a$ through $d$ vertically spaced on the record are shown, with the usual time break on trace $a$. As shown in the figure, the traces are straight lines until the time break occurs, when the geophone signals begin to vary. Regularly-spaced timing lines 15 extending perpendicularly to the geophone signal variations across the time abscissa of the record, are shown. Every $n$th timing line 15' is wider than the others, for convenience in determining the time when any significant result, such as the reflection indicated at A, occurs. For the usual five second geophone signal recording, the narrower timing lines 15 may appropriately represent time intervals of one hundredth of a second, while the wider timing lines 15' represent intervals of one tenth of a second.

The numbering portion of the apparatus forms sequential numerals 16 with increasing time along one edge of the record, preferably corresponding with the wider timing lines 15'. Since the time origin of a geophone record is usually considered the time break, the apparatus is so adjusted that a wider timing line coincides therewith, and that line is numbered 00, though any other arrangement may be made.

The convenience of locating the time after the time break of an interesting event on the geophone record is shown in Fig. 2, where the reflection indicated at A is readily seen to have occurred 0.35 second after the time break.

Referring now to Fig. 3, the geophone signals and the time break are usually recorded in the field on a magnetic recorder which then furnishes a magnetic tape which may be played back in playback equipment 20. A timing signal is usually recorded with the geophone signals and may take the form of the synchronizing wave of equally time-spaced pulses of voltage obtained with the apparatus of the Erath, Madeley and Hefer application above referred to. The synchronizing timing signal is furnished by the playback equipment to an amplifier and shaper 21 which furnishes an appropriately-shaped output to a single shot multivibrator 22. The output of unit 21 is also furnished to a diode clipper 23 which has a floating clipping level, appropriately determined by the amplitude of all but the $n$th pulses of the wave of timing pulses reaching the clipper. Since the $n$th pulses have a greater amplitude than the others, they pass from the diode clipper to a pulse modifying circuit 24 which supplies its output to the multivibrator 22. The modifying circuit operates in such manner as to widen the $n$th pulses of the output of the multivibrator. The output of the multivibrator is furnished to an output stage 25 which drives light source 10 to turn on the source for lengths of time determined by the widths of the pulses. As indicated in connection with Fig. 1, the light energy from source 10 is directed onto record 1, preferably to expose a narrow strip of the photographic record. Thereby, timing lines 15 and 15' are formed on the record.

The output of the diode clipper 23, formed of equally time-spaced pulses representing the $n$th (or 10th) pulses of the timing wave from the playback equipment, is also furnished to a normally-closed gate 30. The gate is opened by the time break pulse furnished from the playback equipment through a time break amplifier 31 to the gate. When the gate is open, the $n$th pulses, forming a train of equally-time-spaced pulses, are supplied to a pair of amplifiers 32 and 33. The output of amplifier 32 drives the mechanical counter to advance the counter in the usual fashion. The output of amplifier 33 drives a trigger circuit 34 which energizes the photoflash light source 13. The circuits described are preferably designed so that the photoflash operates instantaneously with the leading edge of each pulse that reaches it to flash the numeral of the counter on the record, while the counter operates after the photoflash to advance the numeral. Thereby the counter is advanced automatically after each flash to expose the next sequential numeral.

Referring now to Fig. 4, the circuits represented by blocks in Fig. 3 will be described in more detail. The timing input from the playback equipment 20 is represented by block 40 of Fig. 4 and consists of the waveform shown, comprising equally time-spaced pulses of voltage with every $n$th pulse of greater amplitude than the others. This waveform is supplied to a triode 41 through a potentiometer 42, and the plate of the triode is capacity-coupled to a pentode amplifier 43. The plate of the pentode is connected to the cathode of the triode through the series combination of a resistor 44 and a capacitor 45, this circuit performing the usual feedback function. The plate of the pentode is also connected through the series combination of capacitor 45' and resistor 46 with the shunt combination of capacitor 47 and resistor 48 to ground. This network performs a phase-shifting function to delay all but the $n$th pulses to compensate for the smaller slope of the leading edges of the $n$th pulses, thereby insuring that the effective portions of all pulses are equally spaced in time.

The voltage across resistor 48 is supplied to the grid of triode section 50a of a Schmitt trigger circuit 51, having the usual second triode section 50b. The trigger pulse output of the Schmitt trigger circuit is applied from the plate of triode section 50b to the grid of one triode section 52a of a single shot multivibrator 22. The output of the multivibrator is supplied to a pentode amplifier 53 which forms output stage 25, and the glow modulator tube 10 is cathode-coupled to the pentode.

The plate of pentode 43 of the amplifier and shaper 21 is connected to the diode clipper 23 which includes a pair of diode sections 60a and 60b. Diode section 60a is connected in series with the shunt combination of a capacitor 61 and a resistor 62, which is grounded. The output of the pentode 43 is developed across the series combination of a capacitor 63, a resistor 64, and a resistor 65 which forms the cathode resistor of diode 60a. The output is also developed across the series combination of a capacitor and a resistor 67, the resistor forming the cathode resistance of diode 60b. As indicated above, the clipping level of the diode clipper is established by the amplitude of the pulses of the input wave other than the $n$th pulses, though the circuit might be designed to have a static adjustable clipping level. Consequently, the $n$th pulses only pass through the clipper and are supplied as a train of equally time-spaced pulses of voltage to a monostable multivibrator 70. The multivibrator 70 includes triode sections 71a and 71b, and the clipper output is supplied to the plate of section 71a. A clamper circuit including diode 72 and resistor 73 connected between the grid of triode section 71b and ground, and a resistor 74 connected between the cathode of the diode and B+, is provided to clamp the multivibrator output to an appropriate level.

The output of the multivibrator 70 is supplied through a cathode-coupled stage 75 to the pulse modifying circuit 24. The pulse modifying circuit includes the series combination of a diode 80 and a pair of resistors 81 and 82 connected between the grid of triode section 52b of multivibrator 22 and ground, and a resistor 83 connected between the junction of resistors 81 and 82 and B+. Pulse modifying circuit 24 increases the width of the $n$th pulses from multivibrator 22 by increasing the conduction time of triode section 52b thereof during those pulses.

The $n$th pulses from multivibrator 70 are also supplied to gate 30, being derived from the plate of triode section 71b and supplied across the series combination of a resistor 85, a capacitor 86, and a resistor 87. The gate is formed by a screen grid thyratron tube 88 having its control grid connected through the portion of a potentiometer 89 determined by the position of the slider and resistor 87 to ground. The potentiometer controls the gate bias.

The time break input from the playback equipment 20 is represented by block 90 of Fig. 4. The time break pulse is amplified in amplifier 31 comprising stages 91 and 92 and used to control a monostable multivibrator 93. The multivibrator is coupled through a glow tube 94 to the grid of a cathode follower stage 95. The output of the cathode follower is developed across the series combination of resistor 96, potentiometer 89 and resistor 87. The time break pulse is thereby supplied to the gate 30 to open it and allow the train of the *n*th timing pulse to pass through.

The cathode of the gate thyratron 88 is connected through a capacitor 100 to ground and a circuit including a trigger coil 101 is connected across the capacitor. The trigger coil supplies a triggering pulse to photoflash tube 13 for every pulse from the gate.

The train of pulses from the gate passes through a buffer circuit 102 and an amplifier 103 forming the amplifier 32 and drives the advance coil 104 of the mechanical counter 12. Each pulse from the gate energizes the counter to change the exposed numeral thereof to the next higher number, but the coil 104 operates after photoflash 13 is energized, so that the counter numeral is changed only after the previous number on the counter is recorded on the record.

Counter 12 also has a reset coil 105 operable when energized to return the counter to its zero setting. One side of the coil is connected to voltage source 106, while the other side is connected through the normally-closed contacts of a relay 107 to the voltage source. Thus, the counter is returned to its zero position when relay 107 is de-energized. The relay coil has one of its terminals connected to the voltage source, and the other terminal is connected through a normally-open switch 108 to the voltage source. Switch 108 is the motor switch to complete a power circuit for the record drive motor 3 when the switch is closed.

In operation of the apparatus of the invention, switch 108 is closed to start the record drive motor and energize relay 107 to open the reset circuit for counter 12. The playback apparatus is then started, and the timing line input supplied to glow modulator tube 10 to expose narrow strips of the record to form timing lines thereon, with the *n*th lines wider than the others. When the time break pulse arrives, the gate is opened and each pulse of the train of the *n*th pulses flashes the photoflash tube to expose the record with light energy modulated by the numeral on the counter, then to advance the counter to the next sequential numeral. Thereby a record of the type shown in Fig. 2 is obtained.

The apparatus of the invention has been described in conjunction with a preferred embodiment thereof. It will be obvious that many minor modifications could be made in the apparatus described without departure from the scope of the invention. Therefore, the invention is not to be considered limited to the embodiment described, but only by the scope of the appended claims.

We claim:

1. Apparatus for placing timing lines and numerals therefor on a photographic record which is continuously advancing past a device for recording information thereon, comprising synchronizing means for generating a wave of equally time-spaced pulses of voltage having every *n*th pulse of different parameter than the other pulses, means responsive to said different parameter for selecting the *n*th pulses to provide a train of equally time-spaced pulses of voltage, means including a first light source connected to said generating means operable to direct light from said source onto said record along a narrow strip thereof each time the first source is energized, said first light source being energized coincident with and during each pulse of said wave, a counter including means carrying a series of sequential numerals and means responsive to voltage pulses operable to advance said carrying means after the trailing edge of each pulse to place said numerals sequentially in a predetermined location, means including a second light source operable when the source is energized to direct light onto said predetermined location and to direct light energy modulated by the numeral in said predetermined location upon said record, means supplied with said train of pulses of voltage operable to energize said second light source coincident with and during each such pulse of voltage and means for supplying the pulses of voltage of said train to said responsive means operable to advance the carrying means each time after said second light source is operated.

2. Apparatus for placing timing lines and numerals therefor on a photographic record which is continuously advancing past a device for recording information thereon, comprising synchronizing means for generating a wave of equally time-spaced pulses of voltage having every *n*th pulse of different parameter than the other pulses, means responsive to said different parameter for selecting the *n*th pulses to provide a train of equally time-spaced pulses of voltage, means including a first light source operable to direct light from said source onto said record along a narrow strip thereof each time the first source is energized, a single shot multivibrator operable when supplied with a pulse of voltage to generate a pulse of voltage, means for supplying said wave of pulses to said multivibrator, means for supplying said train of pulses to said multivibrator to widen the pulse output of the multivibrator corresponding to every *n*th pulse of said wave, means for connecting the output of said multivibrator to said first light source to energize the first light source during each pulse thereof, a counter including means carrying a series of sequential numerals and means responsive to voltage pulses operable to advance said carrying means after the trailing edge of each pulse to place said numerals sequentially in a predetermined location, means including a second light source operable when the source is energized to direct light onto said predetermined location and to direct light energy modulated by the numeral in said predetermined location upon said record, means supplied with said train of pulses operable to energize said second light source coincident with and during each pulse of the train, and means for supplying said train of pulses to said responsive means operable to advance the carrying means each time after said second light source is operated, whereby timing lines for each pulse of said wave are placed on said record and the *n*th lines are wider than the others and identified with sequential numerals.

3. In combination with an apparatus for recording geophone signals including a time break signal on a photographic record which is continuously advancing past a device for recording geophone signals thereon, apparatus for placing timing lines and numerals therefor on the record along with the geophone signals comprising synchronizing means for generating a wave of equally time-spaced pulses of voltage having every *n*th pulse of different parameter than the other pulses, means responsive to said different parameter for selecting the *n*th pulses to provide a train of equally time-spaced pulses of voltage, means including a first light source operable to direct light from said source onto said record along a narrow strip thereof each time the first light source is energized, a single shot multivibrator operable when supplied with a pulse of voltage to generate a pulse of voltage, means for supplying said wave of pulses to said multivibrator, means for supplying said train of pulses to said multivibrator to widen the pulse output of the multivibrator corresponding to every *n*th pulse of said wave, means for connecting the output of said multivibrator to said first light source to energize the first light source during each pulse thereof to provide a timing line on said record for each pulse of said wave with every *n*th line of greater width than the others, a counter including means carrying a series of sequential numerals and means responsive to voltage pulses operable to advance said carrying means after the trailing edge of each pulse to place said numerals sequentially in a predetermined location, means including a second light source operable when the source is energized to direct light onto said predetermined location and to direct light energy modulated by the numeral in said predetermined location upon said record, a gate supplied with said train of pulses operable when open to supply said train of pulses to said second light source to energize the source coincident with and during each pulse of the train, means for supplying said time break to said gate to open it, said gate also being operable when open to supply said train of pulses to said responsive means to advance the carrying means each time after said second light source is operated, whereby the $n$th ones of said lines are identified with sequential numerals.

4. In combination with apparatus for recording geophone signals on a photographic record including a magnetic recorder playback apparatus carrying a record tape bearing a magnetic recording of a time break and the geophone signals together with a synchronizing wave of equally time-spaced pulses of voltage with every $n$th pulse of greater amplitude than the others, a device for recording the time break and the geophone signals on the photographic record, and means for advancing the record continuously past said device, apparatus for recording timing lines and identifying numerals therefor on the record, comprising a clipper with clipping level determined by the amplitude of pulses of said wave other than the $n$th pulses supplied with said wave, said clipper being operable to pass only said $n$th pulses to provide a train of equally time-spaced pulses of voltage, a multivibrator supplied with said wave of pulses and with said train of pulses and operable to supply an output of equally time-spaced pulses of voltage with every $n$th pulse of greater duration than the others, means including a first light source operable to direct light from said source onto said record along a narrow strip thereof each time the first light source is energized, said output of the multivibrator being supplied to said first light source to energize it during each pulse and provide a timing line on said record for each pulse of said wave with every $n$th line of greater width than the others, a counter including means carrying a series of sequential numerals and means responsive to voltage pulses operable to advance said carrying means after the trailing edge of each pulse to place said numerals sequentially in a predetermined location, means including a second light source operable when the source is energized to direct light onto said predetermined location and to direct light energy modulated by the numeral in said predetermined location upon said record, a gate supplied with said train of pulses operable when open to supply said train of pulses to said second light source to energize the source during each pulse of the train, means for supplying said time break to said gate to open it, said gate also being operable when open to supply said train of pulses to said responsive means to advance the carrying means each time after said second light source is operated, whereby the $n$th ones of said lines are identified with sequential numerals.

References Cited in the file of this patent

UNITED STATES PATENTS

| | | |
|---|---|---|
| 2,496,392 | Hasbrook | Feb. 7, 1950 |
| 2,518,499 | Smith | Aug. 15, 1950 |
| 2,641,523 | Beckman et al. | June 9, 1953 |
| 2,697,648 | Kerr et al. | Dec. 21, 1954 |
| 2,707,524 | Montgomery | May 3, 1955 |